United States Patent

[11] 3,618,879

| [72] | Inventor | Milford R. Murphy<br>Arlington, Tex. |
|---|---|---|
| [21] | Appl. No. | 849,988 |
| [22] | Filed | Aug. 14, 1969 |
| [45] | Patented | Nov. 9, 1971 |
| [73] | Assignee | Bell Aerospace Corporation<br>Hurst, Tex. |

[54] PITCH/ROLL TO YAW FLIGHT COORDINATOR
6 Claims, 3 Drawing Figs.

[52] U.S. Cl............................................. 244/77 E,
                                                    244/17.13
[51] Int. Cl............................................. B64c 13/18
[50] Field of Search............................... 244/77, 77
                                                    D, 77 E, 17.13

[56]         References Cited
         UNITED STATES PATENTS
| 2,771,258 | 11/1956 | Johnson...................... | 244/77 E |
| 2,801,816 | 8/1957 | Meredith..................... | 244/77 E |
| 2,832,552 | 4/1958 | Schuck........................ | 244/77 E |
| 2,955,783 | 10/1960 | Eckhardt..................... | 244/77 E |

Primary Examiner—Milton Buchler
Assistant Examiner—Jeffrey L. Forman
Attorney—Richards, Harris & Hubbard ABSTRACT: A pilot maneuvering aid wherein a yaw control signal is made proportional to the difference between C and the sum A+B where A is the product of pitch rate and the sine of the roll angle, B is the product of yaw rate and the cosine of the roll angle, and C is turn rate.

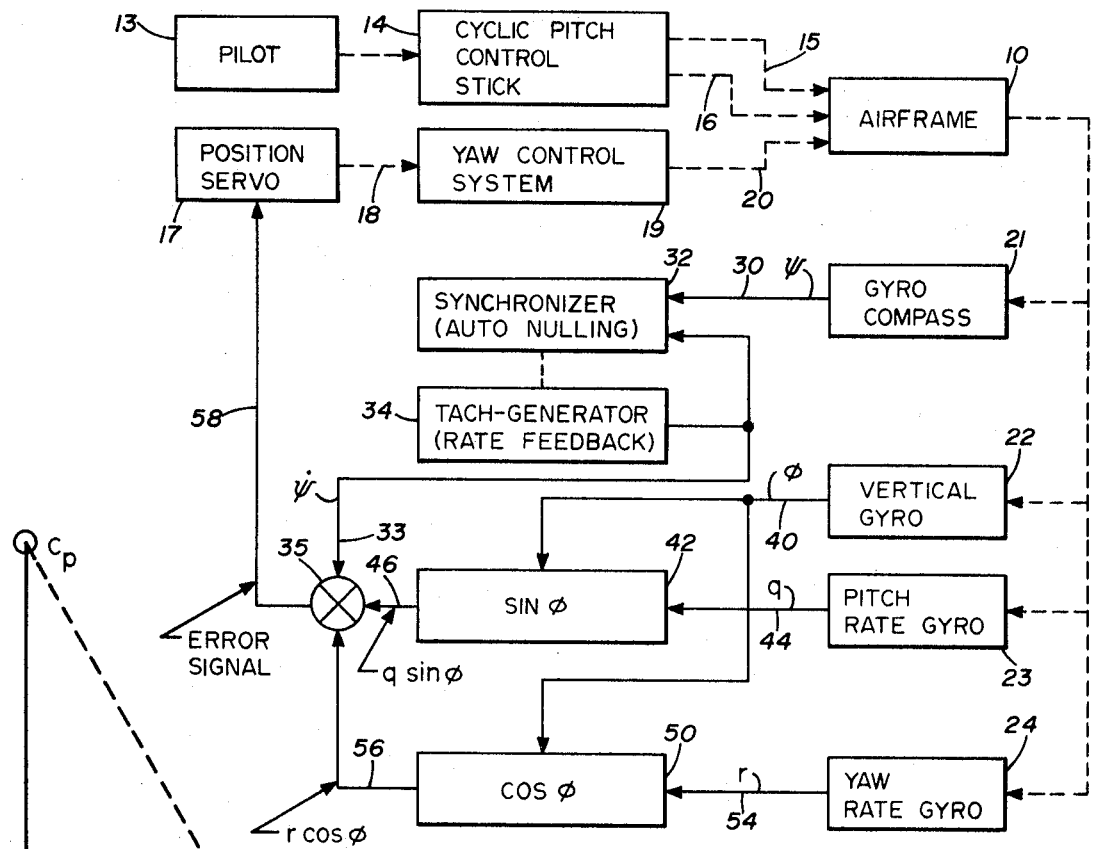
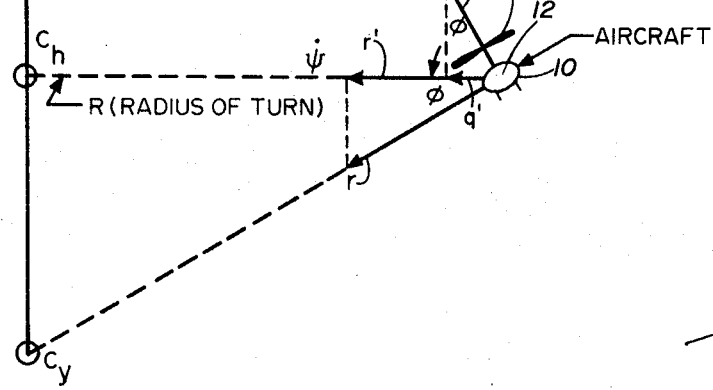
FIG. 2
FIG. 1
INVENTOR
MILFORD R. MURPHY

INVENTOR
MILFORD R. MURPHY

PITCH/ROLL TO YAW FLIGHT COORDINATOR

THE INVENTION

This invention relates to aircraft pilot maneuver aids and, more particularly, to a system capable of full-time operation employing attitude and attitude rate signals on first and second axes respectively to command an attitude rate about the third axis.

BACKGROUND

Normally, in maneuvering an aircraft of either rotary or fixed-wing configuration, a turn is coordinated through the operation of two control elements. For example a pilot will use the cyclic stick and the rudder pedals on a rotary-wing aircraft, and will employ the wheel and pedals on a fixed-wing aircraft. In both cases he established a turn by rolling to the desired attitude and coordinating pitch attitude rate and yaw attitude rate by action of the cyclic stick (or wheel) and the pedals, respectively.

Automatic turn coordinators are known herein roll attitude and ground speed or air speed are required to provide a turn rate command. Such units are normally used only during the actual classical coordinated turn maneuver. Other units use side slip sensors of the inertial or differential airspeed type. Such units normally are used in attitude-hold types of stabilization systems.

One objective in providing aircraft control is to simplify the various operations necessary to fly the craft in the desired manner. The coordinator of the present invention improves the handling qualities by automatically coordinating yaw rate during a maneuver as a function of roll attitude and pitch rate. The "pitch/roll to yaw" coordinator of this invention is of additional significance over conventional systems in that it is adaptable to, and preferably will be used as, a full-time maneuvering aid and may be engaged continually, not just during a classical coordinated turn.

More particularly, in accordance with the present invention, a system is provided for automatically producing a coordinated maneuver in response to commands in roll and pitch. A directional reference device is provided for generating a turn rate signal. A vertical reference device generates a roll-attitude signal. Means are provided for generating a pitch rate signal. Means are then provided responsive to the roll-attitude signal and the pitch rate signal for generating a first output signal representative of the product of the pitch rate signal and the sine of the roll angle. Means are also provided for generating yaw rate signal and for generating a second output signal which is representative of the product of the yaw rate signal and the cosine of the roll angle. A yaw command is then produced which is proportionate to the difference between the sum of the first and second output signals and the turn rate signal.

For a more complete understanding of the present invention and for further objects and advantages thereof, reference may now be had to the following description taken in conjunction with the accompanying drawings in which:

FIG. 1 illustrates the vector relationship of pertinent flight parameters during a coordinated turn;

FIG. 2 is a functional block diagram of a system embodying the present invention.

PREFERRED EMBODIMENTS

Figure 3:
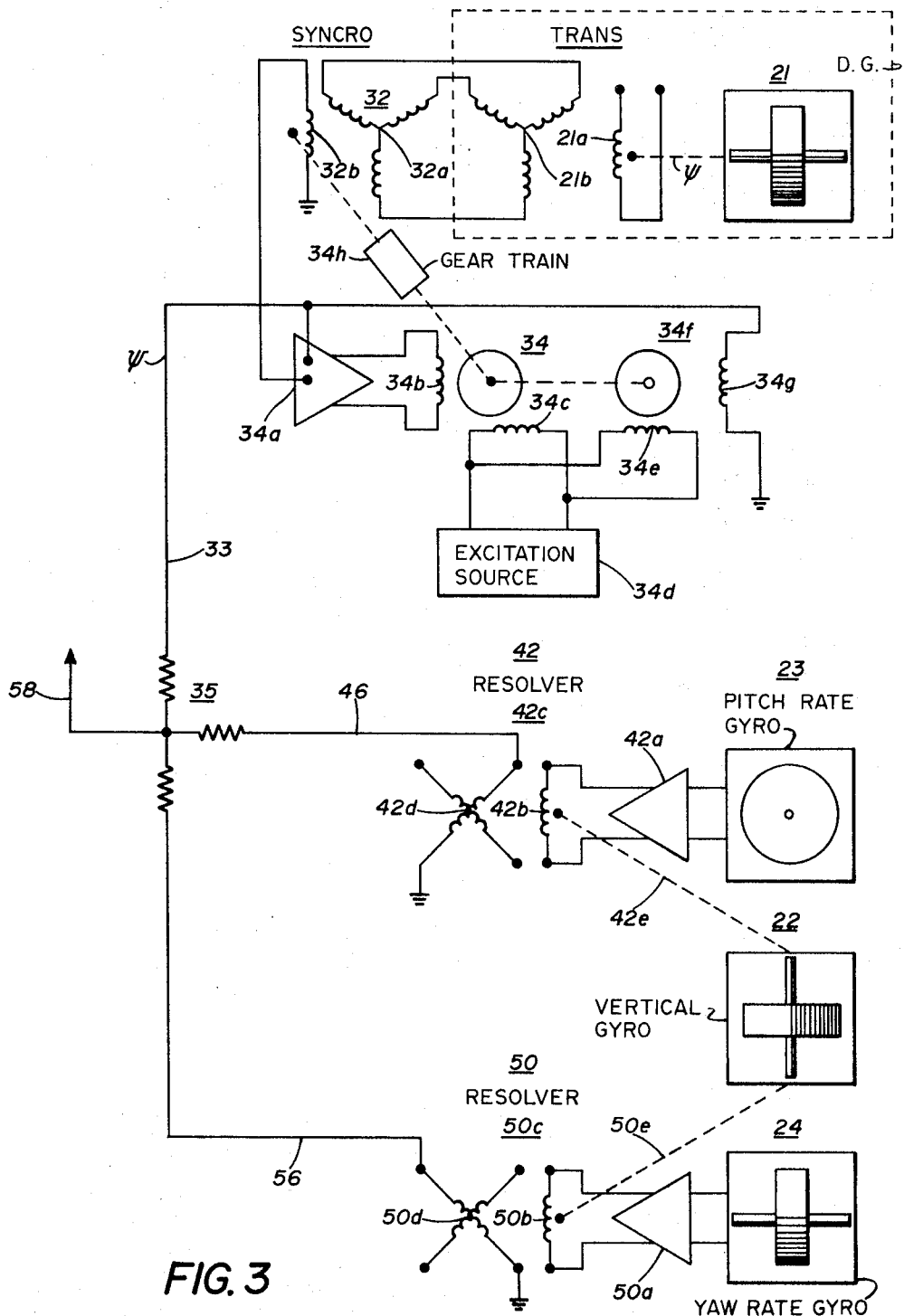
FIG. 3 is a more detailed circuit diagram of portions of the system of FIG. 2.

The present invention is applicable to either rotary or fixed-wing aircraft, and will be described herein in connection with a helicopter. The vector relationships of the pertinent flight parameters during a coordinated turn on such an aircraft is illustrated in FIG. 1.

FIGURE 1

The helicopter 10 is shown figuratively as having a rotor 11 positioned thereabove. The helicopter 10 is illustrated as in a bank, tilted about the longitudinal axis of the aircraft. The latter axis extends perpendicular to the plane of the paper. In such a coordinated turn the helicopter has a tangential velocity (into the plane of the paper), an established bank angle $\Phi$, and a turning rate $\psi$ in the horizontal plane.

A coordinated turn involves a pitch rate and a yaw rate, which are illustrated in FIG. 1 by the vectors $q$ and $r$ operating around centers $C_p$ and $C_y$, respectively. Pitch rate $q$ and yaw rate $r$ establish the turning rate $\psi$ operating around center $C_h$, the magnitude of which can be determined by resolving vectors $q$ and $r$ into coordinates $q'$ and $r'$ in the turning plane. Thus, the aircraft 10 is shown in a coordinated turn in the horizontal plane around center $C_h$ with a pitch rate $q$ around center $C_p$ and a yaw rate $r$ around center $C_y$.

From FIG. 1 it can be seen that the following geometric relationship exists:

(1) $\quad \dot{\psi} = q \sin \Phi + r \cos \Phi$ or (2) $\quad q \sin \Phi = \dot{\psi} - r \cos \Phi$ When the equation is balanced the turn is coordinated. Such balancing can be accomplished, as shown in FIG. 2, by treating functions $\dot{\psi}$ and $r \cos \Phi$ as the controlled variables in the airframe feedback loop, and employing an electrical summing network to determine the error signal which produces a yaw control input in response thereto. The yaw control input effects a yaw rate which solves the equation by reducing the error signal to a negligible value.

This approach enables the pilot to achieve a coordinated turn by manipulation of a single element that commands both pitch and roll rates, for example, the cyclic stick of the helicopter or the wheel of a fixed-wing airplane.

FIGURE 2

Referring to FIG. 2, the helicopter 10 has an input from the pilot 13 by way of a cyclic pitch control stick 14 to induce both lateral control by way of linkage 15 and longitudinal control by way of linkage 16. A position servo 17 is illustrated as coupled by way of linkage 18 to a yaw control system 19. The yaw control system is coupled to the airframe by way of linkage 20.

Sensors included in the airframe 10 are:
a. gyrocompass 21 which provides a heading signal,
b. a vertical gyro 22 that gives a roll signal,
c. a pitch rate gyro 23, and
d. a yaw rate gyro 24. The gyro compass 21 provides a turning (heading) output signal $\psi$ in the horizontal plane and is connected by way of channel 30 and synchronizer 32 to provide a turning rate signal $\dot{\psi}$ on line 33 which is the output of tachometer generator 34. Thus, a turning rate signal is applied by way of channel 33 to a summation unit 35.

The vertical gyro 22 provides an output signal $\Phi$ on line 40 which leads to a multiplying unit 42, which has a second input signal $q$ derived from the pitch rate gyro 23 by way of line 44. The output signal of the unit 42, representing the signal $q \sin \Phi$, appears on line 46 and is applied to the summation unit 35.

The output of the vertical gyro 22 is also applied to a multiplier unit 50, which has a second input signal $r$ supplied by a yaw rate gyro 24 by way of channel 54. The output signal of the multiplier 50 is representative of the quantity $r \cos \Phi$. Line 56 leads to the summation unit 35. The output of the summation unit on channel 58 is an error signal as determined by equation (2) above which drives the position servo 17.

Preferably, a vertical gyro having an auxiliary shaft output will be employed to drive a resolver to produce the sine and cosine multiplication. Alternatively, an electromechanical synchronizer or selsyn can be slaved to the gyro to produce the multiplication function.

To simplify mechanization of the system, rate gyros which measure angular rates in terms of aircraft coordinates may be used as an approximate measurement of the angular rates around $C_h$, $C_p$, and $C_y$, particularly if the aircraft is equipped with automatic stabilization means.

The system may, of course, be applied to existing automatic flight control systems and may employ various components of such systems.

FIGURE 3

In FIG. 3, a preferred embodiment of the system of FIG. 2 has been shown in greater detail to illustrate signal generation and modification. In this embodiment, the directional gyro 21 includes an armature 21a of a synchro transmitter in which the windings 21b are connected back to back to synchro 32. The secondary winding 32b of the synchro 32 is connected at its output to an amplifier 34a. The primary 21a of the transmitter is excited from a suitable alternating current source such as generally employed in aircraft, namely, 26 volts at 400 cycles per second. Thus, there is applied to the amplifier 34a a signal representing the error output of the directional gyro 21. If the aircraft is turning at a given rate, an error signal is produced and applied to amplifier 34a. The amplifier output energizes a motor winding 34b. The fixed phase winding 34c of the motor is energized from a suitable excitation source 34d. Source 34d also energizes one winding of 34e of a tachometer generator 34f. The second winding of generator 34f, the winding 34g, is connected by way of channel 33 to the adding network 35. Channel 33 is also connected to a feedback input in the amplifier 34a. The motor 34 is connected by means of a gear train 34h to the synchro 32 to reduce the error to zero. Gear train 34h has a high speed reduction, preferably of the order of several hundred to one. Thus the generator 34f may run at substantial speed while correcting small error in the synchro. By this means a signal is produced on channel 33 which is proportional to the turning rate.

The pitch rate gyro 23 is connected by way of an amplifier 42a to a rotor 42b of a resolver 42c of unit 42. The resolver 42c is thus excited by the output signal from the pitch rate gyro 23. The sine angle winding 42d on the resolver 42c is connected by way of channel 46 to the adding network 35. The rotor 42b is mechanically driven by way of linkage 42e from the vertical gyro 22. Thus, the signal on channel 46 represents the function $q \sin \Phi$.

The yaw rate gyro 24 is connected at its output to an amplifier 50a. The output of amplifier 50a is connected to the rotor 50b of a resolver 50c in unit 50. The cosine winding of the stator, the winding 50d is then connected to the channel 56 leading to the adding network 35. The rotor 50b of the resolver 50c is mechanically driven by way of linkage 50e leading from the vertical gyro 22. By this means, the signal online 56 is representative of the function $r \cos \Phi$.

While the tachometer generator 34 has been shown schematically, it may be the well-known type such as, for example, the Servo Motor-Damping Generator R809 manufactured and sold by the Kearfott Division of General Precision, Inc., Little Falls, New Jersey. The resolver may be of the type R 587 Precision Synchro-Resolver manufactured and sold by the same company. The transmitter and synchro in units 21 and 32 may be of well-known type.

Thus, the system of FIG. 3 provides a more detailed explanation of the system of FIG. 2 to provide the necessary signals to the adder 35 for the control above described.

Having described the invention in connection with certain specific embodiments thereof, it is to be understood that further modifications may now suggest themselves to those skilled in the art and it is intended to cover such modifications as fall within the scope of the appended claims.

What is claimed is:

1. A system for producing a coordination maneuver in an aircraft in response to commands in roll and pitch which comprises:
    a. means including a directional reference device for generating a turn rate signal,
    b. means responsive to aircraft movement for generating a first output signal representative of the product of pitch rate and the sine of the roll angle of said aircraft,
    c. means responsive to aircraft movement for generating a second output signal representative of the product of the yaw rate and the cosine of the roll angle of said aircraft, and
    d. means for generating a command signal in proportion to the difference between said turn rate signal and the sum of said first and second output signals to command yaw of said aircraft.

2. The combination set forth for claim 1 wherein said means for generating the turn rate signal include a directional gyro and a synchro connected to respond to the output of said gyro, a motor generator unit having a speed-reducing gear train connected between said motor and said synchro for nulling the output of said synchro, an amplifier connected to respond to the difference between the output of said synchro and the output of said generator, and circuit means extending from said generator to a summation means common to the output of the means for producing said first signal and the means for producing said second signal.

3. The combination set forth in claim 1 wherein a vertical gyro is connected to two resolver units, one of which is energized by said pitch rate signal and the other of which is energized by said yaw rate signal to produce said first and second output signals respectively.

4. A system for producing a coordinated maneuver in an aircraft in response to commands in roll and pitch which comprises:
    a. a directional reference device for generating a turn rate signal,
    b. a vertical reference device for generating a roll signal,
    c. means for generating a pitch rate signal,
    d. means responsive to the roll signal and the pitch rate signal for generating a first output signal representative of the product of said pitch rate signal and the sine of the roll angle as represented by said roll signal,
    e. means for generating a yaw rate signal in the plane of the airframe,
    f. means for generating a second output signal representative of the product of the yaw rate signal and the cosine of the roll angle as represented by said roll signal, and
    g. means for generating a command signal for a control element of said aircraft to introduce yaw in proportion to the difference between said turn rate signal and the sum of said first and second output signals.

5. A system for producing a coordinated maneuver in an aircraft in response to commands in roll and tapes which comprises:
    a. a directional gyroscope having pickoff means for generating a synchro excitation signal representative of the deviation of said aircraft from a reference heading,
    b. a synchro connected to said pickoff means for generating a signal representative of said deviation,
    c. an amplifier connected to said synchro,
    d. a motor generator unit having the motor portion thereof connected to and energized by the output of said amplifier with the output of said generator connected to the input of said amplifier in a feedback sense to drive said motor independence upon the difference between the output of said synchro and the output of said generator,
    e. a gear train connecting said motor and said synchro for nulling said synchro,
    f. an adder having one input thereof connected to the output of said generator,
    g. means responsive to aircraft movement for generating a first output signal representative of the product of pitch rate and the sine of the roll angle of said aircraft,
    h. means responsive to aircraft movement for generating a second output signal representative of the product of the yaw rate and the cosine of the roll angle of said aircraft, and means for applying said first output signal and said second output signal to said adder to produce a control signal proportional to the difference between said turn rate signal and the sum of said first and second output signals to command yaw of said aircraft.

6. The method of producing a command signal for control of a coordinated maneuver in an aircraft in response to commands in roll and pitch which comprises:
 a. generating a turn rate signal,
 b. generating a first output signal representative of the product of pitch rate and the sine of the roll angle of said aircraft,
 c. generating a second output signal representative of the product of yaw rate and the cosine of the roll angle of said aircraft, and
 d. combining said turn rate signal and said first and second output signals to produce and maintain said command signal proportional to the difference between said turn rate signal and the sum of said first and second output signals to produce yaw motion of said aircraft.

* * * * *

PO-1050
(5/69)

UNITED STATES PATENT OFFICE
CERTIFICATE OF CORRECTION

Patent No. 3,618,879              Dated November 9, 1971

Inventor(s) Milford R. Murphy

It is certified that error appears in the above-identified patent and that said Letters Patent are hereby corrected as shown below:

Col. 1, line 22, "herein" should be --wherein--;
       line 51, before "yaw" insert --a--.
Col. 2, line 52, "ψ" should be --$\psi$--.
Col. 3, line 71, "coordination" should be --coordinated--.
Col. 4, line 63, "independence" should be --in dependence--.
Col. 5, line 1, before "means" --i.-- was omitted.

Signed and sealed this 25th day of April 1972.

(SEAL)
Attest:

EDWARD M. FLETCHER, JR.              ROBERT GOTTSCHALK
Attesting Officer                     Commissioner of Patents